(12) United States Patent
Zhao

(10) Patent No.: US 9,630,391 B2
(45) Date of Patent: Apr. 25, 2017

(54) METHOD AND APPARATUS FOR SEPARATING FLEXIBLE DISPLAY FILM FROM SUBSTRATE

(71) Applicant: BOE TECHNOLOGY GROUP CO., LTD., Beijing (CN)

(72) Inventor: Dejiang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/420,875

(22) PCT Filed: May 26, 2014

(86) PCT No.: PCT/CN2014/078404
§ 371 (c)(1),
(2) Date: Feb. 10, 2015

(87) PCT Pub. No.: WO2015/106517
PCT Pub. Date: Jul. 23, 2015

(65) Prior Publication Data
US 2016/0031203 A1    Feb. 4, 2016

(30) Foreign Application Priority Data

Jan. 15, 2014    (CN) .......................... 2014 1 0018044

(51) Int. Cl.
*B32B 38/10*        (2006.01)
*B32B 43/00*        (2006.01)
(Continued)

(52) U.S. Cl.
CPC ........ *B32B 43/006* (2013.01); *B32B 37/0053* (2013.01); *B32B 38/0004* (2013.01);
(Continued)

(58) Field of Classification Search
CPC . B32B 38/10; B32B 43/006; Y10T 156/1132; Y10T 156/1174;
(Continued)

(56) References Cited

U.S. PATENT DOCUMENTS 4,246,058 A * 1/1981 Reed .................... B26D 7/1827
156/183
4,631,110 A * 12/1986 Tsumura ............. B29C 63/0013
156/718
(Continued)

FOREIGN PATENT DOCUMENTS

| CN | 1952695 A | 4/2007 |
|---|---|---|
| CN | 101877319 A | 11/2010 |

(Continued)

OTHER PUBLICATIONS

Second Office Action for CN Application No. 201410018044.7, dated Jul. 31, 2015, 4 pages.
(Continued)

*Primary Examiner* — Mark A Osele
*Assistant Examiner* — Nickolas Harm
(74) *Attorney, Agent, or Firm* — Kinney & Lange, P.A.

(57) ABSTRACT

The present disclosure relates to a method and an apparatus for separating a flexible display film from a substrate. The method of separating a flexible display film from a substrate according to the present disclosure comprises the steps of dividing the substrate attached with the flexible display film on a side thereof into a plurality of pieces, and separating part or all of the plurality of pieces from the flexible display film. The apparatus for separating a flexible display film from a substrate according to the present disclosure comprises a division component configured to divide the substrate attached with the flexible display film on a side thereof into the plurality of pieces, and a substrate-film separation
(Continued)

component configured to separate part or all of the pieces from the flexible display film.

16 Claims, 5 Drawing Sheets

(51) Int. Cl.
*B32B 37/00* (2006.01)
*B32B 38/00* (2006.01)

(52) U.S. Cl.
CPC .......... *B32B 38/10* (2013.01); *B32B 2457/20* (2013.01); *Y10T 156/1132* (2015.01); *Y10T 156/1174* (2015.01); *Y10T 156/1184* (2015.01); *Y10T 156/195* (2015.01); *Y10T 156/1944* (2015.01); *Y10T 156/1967* (2015.01); *Y10T 156/1978* (2015.01)

(58) Field of Classification Search
CPC ......... Y10T 156/1184; Y10T 156/1195; Y10T 156/1944; Y10T 156/195; Y10T 156/1967; Y10T 156/1978; Y10T 156/1994
USPC ....... 156/707, 715, 717, 719, 758, 759, 762, 156/764, 767, 924, 937
See application file for complete search history.

(56) References Cited

U.S. PATENT DOCUMENTS

| | | | | |
|---|---|---|---|---|
| 4,724,026 A * | 2/1988 | Nelson | ................ | B32B 37/1284 101/32 |
| 5,653,845 A * | 8/1997 | Kawata | ............. | G02F 1/133711 156/718 |
| 6,629,553 B2 * | 10/2003 | Odashima | ......... | H01L 21/67144 156/716 |
| 8,142,610 B2 * | 3/2012 | Tani | .......................... | B08B 7/00 156/715 |
| 8,168,033 B1 * | 5/2012 | Mohamad Nor | ..... | B65C 9/0006 156/247 |
| 2001/0004152 A1 * | 6/2001 | Treleaven | ............. | G09F 3/0289 283/81 |
| 2002/0124948 A1 * | 9/2002 | Mikkelsen | ............ | B08B 7/0028 156/247 |
| 2003/0113500 A1 * | 6/2003 | Ingerslew | ................. | B32B 7/12 428/42.3 |
| 2007/0261783 A1 * | 11/2007 | Larson | ................ | B29C 63/0013 156/247 |
| 2008/0029221 A1 * | 2/2008 | Dangami | ............... | B31D 1/021 156/379 |
| 2008/0185100 A1 * | 8/2008 | Jang | ...................... | B32B 43/006 156/714 |
| 2009/0288760 A1 * | 11/2009 | Garben | .................... | B41J 29/38 156/230 |
| 2010/0203296 A1 * | 8/2010 | Tsai | .................... | H01L 21/6835 428/172 |
| 2011/0092006 A1 * | 4/2011 | An | ..................... | B29D 11/0073 438/29 |
| 2011/0132522 A1 * | 6/2011 | Green | ...................... | B26D 7/10 156/80 |
| 2011/0147747 A1 * | 6/2011 | Jeon | .................... | H01L 27/1218 257/59 |
| 2012/0218503 A1 * | 8/2012 | Tsai | ...................... | G02F 1/1333 349/153 |
| 2013/0011969 A1 * | 1/2013 | Chen | .................... | H01L 51/003 438/111 |
| 2013/0342429 A1 * | 12/2013 | Choi | ...................... | H05K 13/00 345/30 |

FOREIGN PATENT DOCUMENTS

| | | |
|---|---|---|
| CN | 103456689 A | 12/2013 |
| CN | 103681357 A | 3/2014 |
| CN | 103753944 A | 4/2014 |
| JP | 2001022273 A | 1/2001 |
| TW | 201237824 A1 | 9/2012 |
| TW | 201339727 A | 10/2013 |

OTHER PUBLICATIONS

English Translation of the Written Opinion of the International Searching Authority for corresponding PCT Application No. PCT/US2014/078404.
International Search Report and Written Opinion dated Aug. 22, 2014 for PCT/CN2014/078404.
English translation of first Office Action for corresponding Chinese Application No. 201410018044.7, dated May 11, 2015.

* cited by examiner

METHOD AND APPARATUS FOR SEPARATING FLEXIBLE DISPLAY FILM FROM SUBSTRATE

BACKGROUND OF THE INVENTION

Field of the Invention

The present disclosure relates to the technical field of display, and more particular, to a method and an apparatus for separating a flexible display film from a substrate.

Description of the Related Art

With the development of economy and the improvement of science and technology, it becomes possible to realize bended and foldable display. At present, a flexible display device, which can realize bended and foldable display, is usually produced by coating a flexible display film, such as a PI (Polyimide) film.

The existing method of producing a flexible display device by coating a PI film comprises the steps of coating a PI film onto a substrate, forming a display structure on the PI film, cutting the sizes of the PI film and the display structure into a product size, and peeling the PI film formed with the display structure from the substrate (i.e., taking off the PI film formed with the display structure from the substrate). Then, the PI film peeled from the substrate and formed with the display structure is used as a flexible display device.

Since a mechanical strength of the flexible display film is naturally weak, the flexible display film may be heavily damaged, such as be torn, when the flexible display film formed with the display structure is peeled from the substrate, and hence the produced flexible display device may not display images.

SUMMARY OF THE INVENTION

The present disclosure provides a method and an apparatus for separating a flexible display film from a substrate, so as to solve the technical problem existing in the prior art that the flexible display film may be heavily damaged when the flexible display film formed with the display structure is peeled from the substrate, and hence the produced flexible display device may not display images.

According to an aspect of the present disclosure, there is provided a method for separating a flexible display film from a substrate, comprising the steps of dividing the substrate attached with the flexible display film on a side thereof into a plurality of pieces; and separating part or all of the plurality of pieces from the flexible display film.

According to another aspect of the present disclosure, there is provided an apparatus for separating a flexible display film from a substrate, comprising a division component configured to divide the substrate attached with the flexible display film on a side thereof into a plurality of pieces, and a substrate-film separation component configured to separate part or all of the pieces from the flexible display film.

In an embodiment of the present disclosure, the division component comprises a cutting tool configured to cut the substrate to form a plurality of grooves on the substrate, wherein the depth of the grooves is less than the thickness of the substrate, and the plurality of grooves partition the substrate into the plurality of pieces, and a breaking member configured to apply a pressing force onto one of two adjacent pieces to move the one of the two adjacent pieces with respect to the other of the two adjacent pieces to separate the two adjacent pieces from each other along the corresponding groove. Optionally, the breaking member comprises a drum that is adapted to roll on the side of the substrate, and at least the gravity of the drum is exerted on the substrate. The cutting tool cuts the substrate into the plurality of unit blocks, and then the substrate is pressed by using the breaking member, such as the drum, to form the plurality of pieces. In this way, it can be avoided to damage the substrate to which the flexible display film is attached when the cutting tool cuts the substrate, thereby improving a yield of product.

DETAILED DESCRIPTION OF EMBODIMENTS

The method of separating a flexible display film from a substrate according to an embodiment of the present invention comprises the steps of dividing the substrate attached with the flexible display film on a side thereof into a plurality of pieces (i.e., small blocks) and separating part or all of the plurality of pieces from the flexible display film.

Since the substrate to which the flexible display film is attached is divided into a plurality of pieces, a contact area of each piece with the flexible display film is remarkably reduced and thus a resistance that resists peeling of the flexible display film from each piece is also remarkably reduced, compared with a contact area of the whole undivided substrate with the flexible display film, such that it can be ensured to reduce a damage to the flexible display film and hence reduce a risk that the produced flexible display device cannot display images when the substrate and the flexible display film are peeled off from each other.

It should be noted that in the present disclosure the term "a flexible display film" means "a flexible display film formed with a display structure". In an embodiment, "a flexible display film" may be a film coated onto the substrate and formed thereon with a display structure when producing a flexible display device by a coating method, such as a PI film.

Next, the present disclosure will be described in details with reference to the accompanying drawings.

Figure 1:
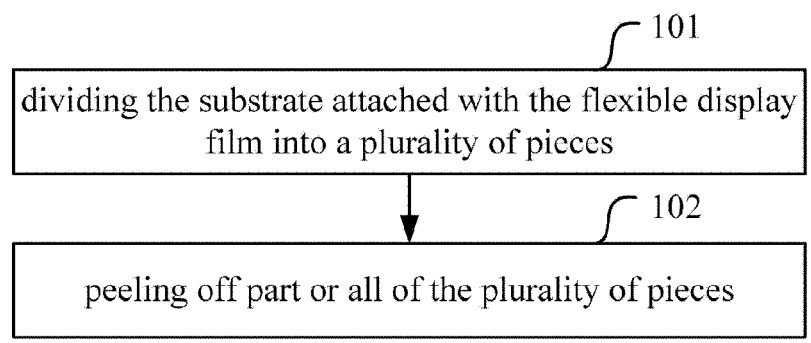
FIG. 1 is a flow chart showing a method for peeling off a flexible display film according to an embodiment of the present invention.
Figure 4:
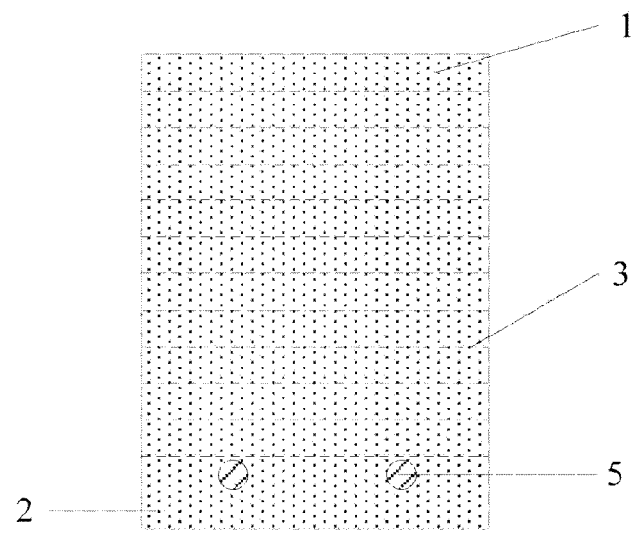
FIG. 4 is a schematic view showing that a substrate attached with a PI film is divided into a plurality of pieces according to an embodiment of the present invention.
Figure 5:
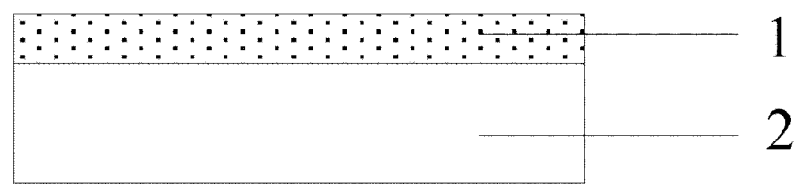
FIG. 5 is a schematic view showing positions of the PI film and the substrate according to an embodiment of the present invention.

In an optional embodiment, with reference to FIGS. 1, 4 and 5, the method of separating the flexible display film from the substrate according to an embodiment of the present invention comprises the steps of:

step 101: dividing the substrate 2 attached with the flexible display film 1 on a side thereof into a plurality of pieces 4;

step 102: peeling parts or all of the pieces 4 off.

In a specific embodiment, at the step 101, any method that can divide the substrate 2 attached with the flexible display film 1 on a side thereof into the plurality of pieces 4 and will not damage the flexible display film or will damage, to the least extent, the flexible display film, is suitable for embodiments of the present invention. For example, the substrate to which the flexible display film is attached is cut into a plurality of pieces by cutting the substrate from a side thereof which no flexible display film is attached to (i.e., the other side of the substrate).

In an optional embodiment, when the substrate 2 is cut into the plurality of pieces 4 from the other side of the substrate 2 (that is, the substrate attached with the flexible display film is divided into the plurality of pieces 4 by cutting the substrate attached with the flexible display film), a cutting depth should be precisely controlled to be equal to the thickness of the substrate, in order to avoid damage to the flexible display film or reduce the damage to the flexible display film as far as possible.

Optionally, the step of separating part or all of the pieces from the flexible display film comprises winding the flexible display film. The step of winding the flexible display film may comprise rolling a drum from an end of the flexible display film to the end thereof. The drum has a rolling circumferential surface that has an attachment function. Optionally, the step of separating part or all of the pieces from the flexible display film further comprises picking the pieces rolled with the flexible display film by using a piece-picking component so as to separate the pieces from the flexible display film.

It should be noted that in the present disclosure the attachment may be performed by a vacuum or by an adhesive tape having an adhesive function.

In an embodiment of the present invention, the step of dividing the substrate 2 into the plurality of pieces 4 comprises cutting the substrate from the other side of the substrate to form a plurality of grooves 3 on the substrate, in which the depth of the grooves 3 is less than the thickness of the substrate and the plurality of grooves 3 partition the substrate into the plurality of pieces 4 (see FIG. 4), and applying a pressing force onto one of two adjacent pieces to move the one of the two adjacent pieces with respect to the other of the two adjacent pieces to separate the two adjacent pieces 4 from each other along a corresponding groove 3.

Further, the step of applying a pressing force onto one of two adjacent pieces to move the one of the two adjacent pieces with respect to the other of the two adjacent pieces comprises rolling a drum 22 from an end of the flexible display film 1 to another end of the flexible display film 1 to separate the two adjacent pieces 4 from each other along the corresponding groove by using the gravity of the drum and/or the pressing force applied on the drum. The drum 22 may be only used to break connection between the two adjacent pieces by applying a pressing force. However, in the case where the drum 22 has a rolling circumferential surface having an attachment function, the drum 22 may perform the step of separating part or all of the pieces from the flexible display film while it rolls to break the connection between the two adjacent pieces. Specifically, the step of separating part or all of the pieces from the flexible display film comprises rolling the drum 22 from an end of the flexible display film to another end of the flexible display film, and picking the pieces rolled with the flexible display film by using a piece-picking component so as to separate the pieces from the flexible display film.

It should be noted that the value of the cutting depth of the substrate attached with the flexible display film, in an embodiment of the present invention, should satisfy the following conditions:

1. the value of the cutting depth is less than the value of the thickness of the substrate;
2. when the cutting depth is at this value, connection between the respective pieces can be broken by pressing or by shocking.

In an optional embodiment, the value of the cutting depth of the substrate attached with the flexible display film in the present disclosure is within a range of [0.5 d, 0.7 d], where d is the value of the thickness of the substrate. Connection between each piece and a piece adjacent thereto can be broken by pressing via driving the drum located at the flexible display film-side to roll, so as to divide the substrate attaché with the flexible display film into the plurality of pieces.

In a specific embodiment, since the thickness of the display structure formed on the flexible display film is thinner and the display structure formed on the flexible display film comprises a protection layer, the drum located at the flexible display film-side will not damage the display structure formed on the flexible display film or will damage, to the least extent, the display structure formed on the flexible display film when the drum is rolling.

In a specific embodiment, when the drum located at the flexible display film-side is rolling, any two adjacent pieces contacting with the drum are subject to the gravity of the drum or different pressing forces, such that connection at the bottoms of the two adjacent pieces can be broken.

Since the substrate attached with the flexible display film is not directly split into the plurality of pieces, and the substrate is first cut into pieces connected with each other and then connection between any two adjacent pieces is broken by means of pressing, it can be avoided to cut the flexible display film when cutting the substrate, such that the flexible display film is protected and the damage to the flexible display film is reduced.

In an optional embodiment, at the step 101, the plurality of pieces formed by dividing the substrate attached with the flexible display film on the side thereof may be regular pieces or irregular pieces.

In a specific embodiment, at the step 102, any method for peeling off part or all of the pieces may be suitable for embodiments of the present invention. For example, the plurality of resultant pieces may be peeled off one by one.

If, with the aid of other components (e.g., a film-attaching structure), the drum can also attach the flexible display film and wind up the flexible display film by rolling when the drum is rolling at the flexible display film-side, the pieces 4 adhered to the wound flexible display film 1 can be peeled off at step 102.

Specifically, after the drum is rolled by a certain distance, the flexible display film previously located below the drum will be wound to be located above the drum, such that the pieces adhered to the wound flexible display film can be easily peeled off.

In an optional embodiment, at the step 102, part of the pieces is peeled off. Steps for peeling off it comprise retaining pieces at which an IC (Integrated Circuit) binding portion lies, and peeling off all pieces other than the pieces at which the IC binding portion lies. In the embodiments of the present invention, the IC binding portion is an IC binding portion that is formed by binding the IC for driving the flexible display device to display images onto the substrate attached with the flexible display film. Since the adhesive force at the IC binding portion is much greater than those at other pieces, and thus forcibly peeling off the IC binding portion is likely to damage the IC binding portion and the circuit surrounding it, in the embodiments of the present invention, the pieces at which the IC binding portion lie are retained, so that the IC binding portion and the circuit surrounding it can be protected. This, to a certain extent, avoids an adverse influence on display performance of the flexible display device and improves a yield of product.

In an optional embodiment, at the step 102, for one piece, the step of peeling off this piece comprises picking and holding the piece by an attachment head, and swaying the attachment head from side to side by an operation of swaying from side to side, such that connection between the picked piece and the flexible display film becomes loose. Then, the attachment head is driven to move upwardly, so that the picked piece is separated from the flexible display film.

Swaying the attachment head from side to side by an operation of swaying from side to side so as to loosen connection between the picked piece and the flexible display film can reduce a destructive power to the flexible display film during peeling off the piece and hence reduce a damage to the flexible display film.

In an optional embodiment, the attachment head may pick the piece by means of vacuum picking or adhesive attachment.

In a specific embodiment, any attachment head, such as a suction cup, that can pick and hold the piece is suitable for the embodiments of the present invention.

In an optional embodiment, for one piece, after the piece is peeled off, the peeled-off piece is put to a predetermined position.

Based on the same inventive concept, the embodiments of the present invention also provide a peeling-off apparatus corresponding to the method of peeling off the flexible display film according to an embodiment of the present invention. Since the apparatus for peeling off the flexible display film has the principle for solving the technical problem similar to the method according to the embodiment of the present invention, one skilled in the art can implement the apparatus for peeling off the flexible display film with reference to embodiments of the method, and repeated description is omitted.

Figure 2:
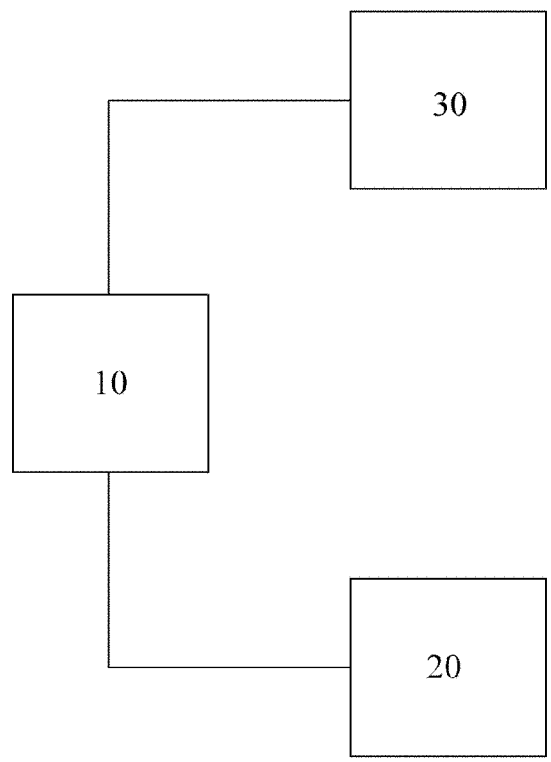
FIG. 2 is a schematic structure view showing an apparatus for peeling off the flexible display film according to an embodiment of the present invention.

In an optional embodiment, as shown in FIG. 2, the apparatus for separating the flexible display film from the substrate according to the embodiment of the present invention comprises a division component 20 configured to divide the substrate 2 attached with the flexible display film on a side thereof into the plurality of pieces 4, and a substrate-film separation component, such as the piece-picking component 30, configured to separate part or all of the pieces from the flexible display film.

A main body component 10 may be connected to the division component 20 and the piece-picking component 30.

In a specific embodiment, the main body component 10 may be a supporting component mechanically connected with the division component 20 and the piece-picking component 30 respectively, or may be a controlling component in signal connection with the division component 20 and the piece-picking component 30.

In the case where the main body component 10 is a supporting component mechanically connected with the division component 20 and the piece-picking component 30, the main body component 10 only functions for support and connection.

In the case where the main body component 10 is a controlling component in signal connection with the division component 20 and the piece-picking component 30 respectively, the main body component 10 not only functions for support and connection, but also provides a signal control for the division component 20 and the piece-picking component 30. That is, the division component 20 divides the substrate attached with the flexible display film into the plurality of pieces under the signal control of the main body component 10, and the piece-picking component 30 peels off part or all of the pieces under the signal control of the main body component 10.

In a specific embodiment, the division component 20 may be a cutting tool. For example, the division component 20 may a device provided at a cutting segment of a production line.

In an optional embodiment, the division component 20 is used for cutting the substrate attached with the flexible display film into the plurality of pieces.

Figure 3A:
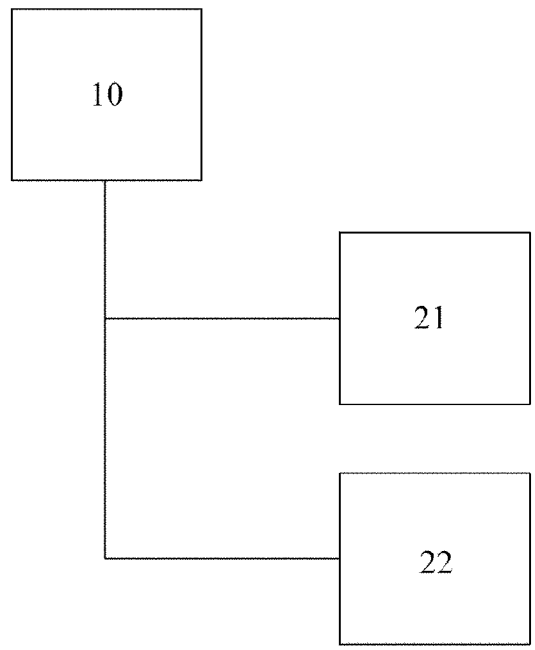
FIGS. 3A and 3B are schematic structure views showing a division component according to an embodiment of the present invention.

In an optional embodiment, as shown in FIG. 3A, the division component 20 comprises a cutting tool 21 and a drum 22. The cutting tool 21 is used to connect with the main body component 10 and cuts the substrate, from a side of the substrate which no flexible display film is attached, into a plurality of unit blocks. The cutting depth is less than the thickness of the substrate. The drum 22 is used to connect with the main body component 10 and rolls at the flexible display film-side to break the plurality of unit blocks into a plurality of pieces by pressing.

In an optional embodiment, the cutting tool 21 may be directly connected with the main body component 10, or may be connected with the main body component 10 by other components.

In a specific embodiment, the cutting tool 21 according to an embodiment of the present invention may be any device or machine that has a function of cutting a substrate, such as a machining stage provided at a cutting section in a production line.

It should be noted that the value of the cutting depth of the substrate attached with the flexible display film, in the embodiment of the present invention, should satisfy the following conditions:
1. the value of the cutting depth is less than the value of the thickness of the substrate;
2. when the cutting depth is at this value, connection between the respective unit blocks can be broken by pressing.

In an optional embodiment, the value of the cutting depth of the substrate attached with the flexible display film in the present disclosure is within a range of [0.5 d, 0.7 d], where d is the value of the thickness of the substrate.

In the case where the main body component 10 is in signal connection with the cutting tool 21, the main body component 10 can send control signals to the cutting tool 21 to control the cutting depth of the substrate by the cutting tool 21.

In an optional embodiment, the cutting tool 21 may regularly cut the substrate attached with the flexible display film or may irregularly cut the substrate.

For example, a PI film is taken as an example of the flexible display film. As shown in FIG. 4, the cutting tool 21 regularly cuts the substrate 2 attached with the PI film 1, and cutting lines 3 created by cutting the substrate 2, to which the PI film 1 is attached, using the cutting tool are evenly distributed. The position relationship between the PI film and the substrate is shown in FIG. 5, and the PI film 1 is positioned on the substrate 2.

In an optional embodiment, the drum 22 may be directly connected with the main body component 10, or may be connected with the main body component 10 by other components.

Figure 3B:
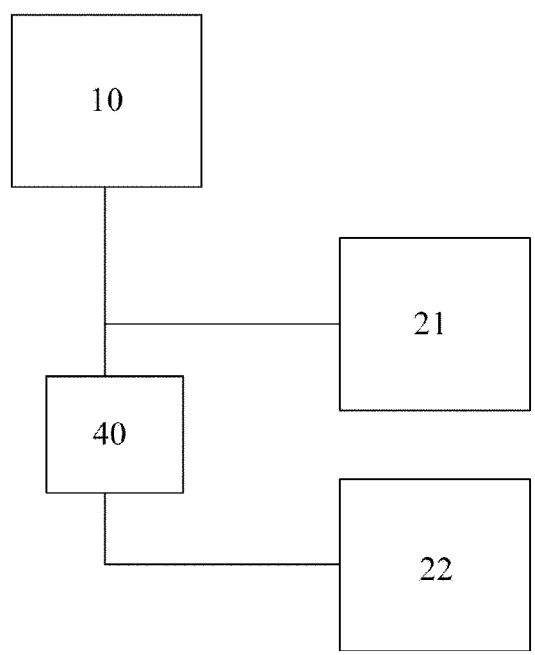

In an optional embodiment, as shown in FIG. 3B, the apparatus for peeling off the flexible display film according to the embodiment of the present invention further comprises a driving component 40. The drum 22 is connected with the main body component 10 by the driving component 40 and the driving component 40 is in transmission connection with the drum 22.

In the case where the drum 22 is directly connected with the main body component 10, the drum 22 may be driven by the main body component 10 to roll. In the case where the drum 22 is connected with the main body component 10 by other components (e.g., the driving component 40) and the other components are in transmission connection with the drum 22, the other components drive the drum 22 to roll.

In an optional embodiment, in the case where the drum 22 is connected with the main body component 10 by the driving component 40, the main body component 10 may be mechanically connected with the driving component 40 or may be in signal connection with the driving component 40. In the case where the main body component 10 is mechanically connected with the driving component 40, the driving component 40 may be an intelligentized component to automatically drive the drum 22 to roll. In the case where the main body component 10 is connected in signals with the driving component 40, the driving component 40 may drive the drum 22 to roll according to the control signals sent by the main body component 10.

Figure 6:
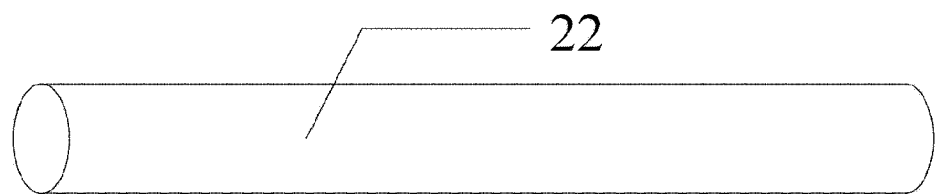
FIG. 6 is a schematic view of a first structure of a drum according to an embodiment of the present invention.

In an optional embodiment, the drum 22 according to the embodiment of the present invention may be any drum existing the prior art. For example, as shown in FIG. 6, the drum 22 is a customary drum having a cylindrical shape.

In operation, when the drum located at the flexible display film-side is rolling, pressing forces exerted by the drum onto two adjacent unit blocks contacting with the drum are different from each other, so that connection at the bottoms of the two adjacent unit blocks are broken.

In operation, rather than directly cutting the substrate, to which the flexible display film is attached, into the plurality of pieces, the cutting tool cuts the substrate, and then connection between any two adjacent pieces is broken by driving the drum to roll and break the two adjacent pieces by pressing. In this way, it can be avoided to cut the flexible display film by the cutting tool during cutting the substrate, so that the flexible display film is protected and the damage to the flexible display film is reduced.

Figure 7:
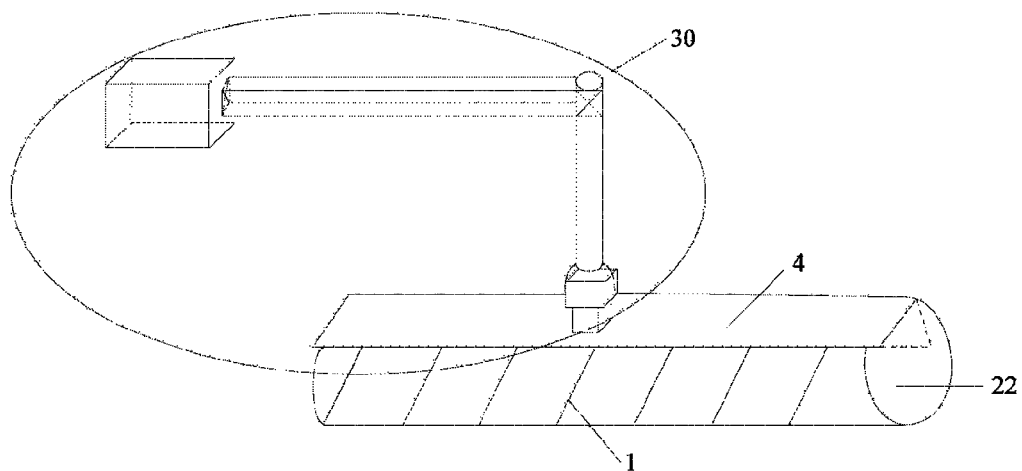
FIG. 7 is a schematic view showing that the piece adhered to the wound flexible display film is peeled off according to an embodiment of the present invention.

In an optional embodiment, as shown in FIG. 7, the apparatus for peeling off the flexible display film further comprises a film attaching structure (not shown in FIG. 7) provided within the drum 22 and configured to assist the drum 22 in picking the flexible display film 1 and in winding up the flexible display film 1 by rolling of the drum 22, and the piece-picking component 30 configured to peel off the pieces 4 adhered to the wound flexible display film 1.

In operation, with the assistance of the film attaching structure, the drum will attach an end of the flexible display film all along. When the drum rolls, the drum will wind up the flexible display film. Thus, after the drum is rolled by a certain distance, the flexible display film previously located below the drum will be wound to be above the drum, so that the pieces adhered to the wound flexible display film can be easily peeled off.

In a specific embodiment, any drum structures that can absorb the flexible display film with the assistance of the film attaching structure are suitable for the embodiments of the present invention. Any film attaching structures that can assist the drum 22 in picking the flexible display film are suitable for the embodiments of the present invention.

In an optional embodiment, the shape of the drum 22 is a hollow structure at least having an air hole A. The film attaching structure comprises a pipeline and at least one air hole passing through the wall of the drum and opening outwards. The air hole is in communication with the pipeline, and a vacuum is formed within the pipeline, such that an attachment force generated through the air hole picks (i.e., attaches) the flexible display film.

In a specific embodiment, the shape of the drum 22 may be a hollow structure enclosed by a plane and/or a curved surface. The air hole may be provided in the plane and/or the curved surface.

Figure 8:
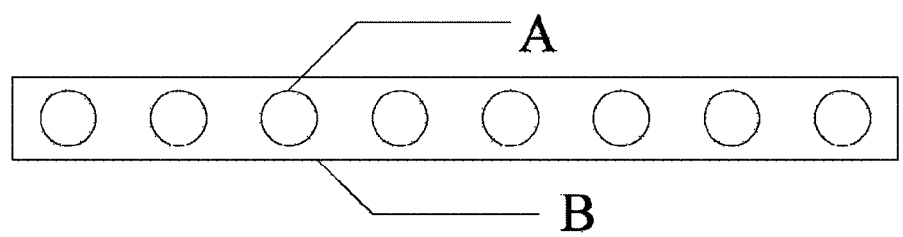
FIG. 8 is a schematic view of a planar shape of the drum formed by one plane and one curved surface according to an embodiment of the present invention.

In an optional embodiment, the shape of the drum 22 is a hollow structure enclosed by one plane and one curved surface, as shown in FIG. 8, and the air hole A is provided in the plane B.

In operation, the air hole is provided in the plane of the drum, so that the drum can firmly attach and hold the flexible display film with the assistance of the film attaching structure.

In an optional embodiment, the piece-picking component 30 may be directly connected with the main body component 10, or may be connected with the main body component 10 by other components. In an optional embodiment, in the case where the piece-picking component 30 is directly connected with the main body component 10, the piece-picking component 30 may be mechanically connected with the main body component 10 or may be in signal connection with the main body components.

Figure 9:
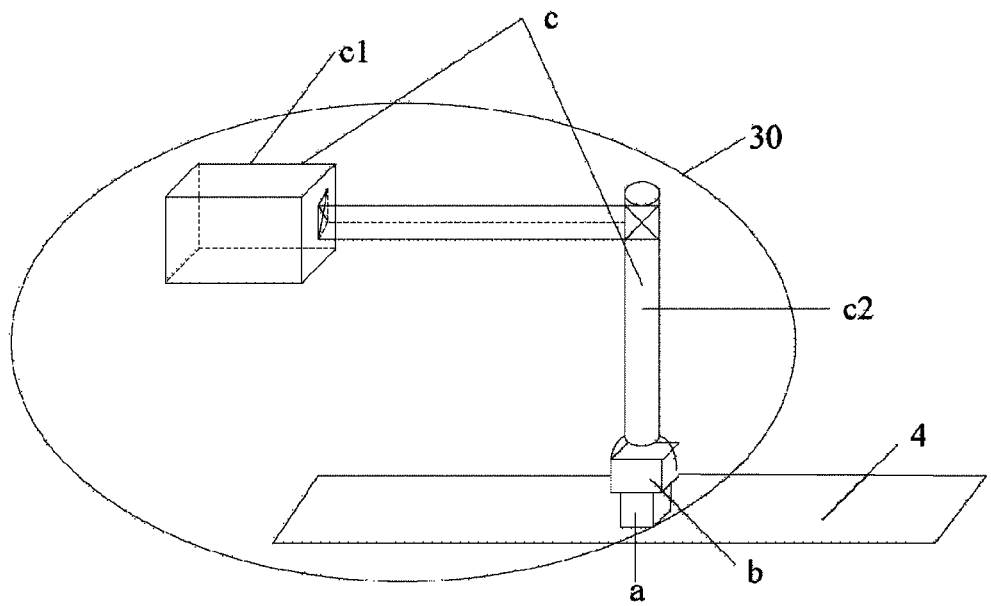
FIG. 9 is a schematic structure view of a piece-picking component according to an embodiment of the present invention.

In an optional embodiment, in the case where the piece-picking component 30 is in signal connection with the main body component 10, as shown in FIG. 9, the piece-picking component 30 comprises an attachment head a, a connection member b and an intelligentized picking sub-system c. The attachment head a is used to attach the pieces 4 to be peeled off. The connection member b is used to connect the attachment head a with the intelligentized picking sub-system c. The intelligentized picking sub-system c is in signal connection with the main body component 10 (not shown in FIG. 9). The intelligentized picking sub-system c automatically sways according to an instruction of swaying sent by the main body component 10 to drive the attachment head a to sway, so as to loosen connection between the piece attached by the attachment head a and the flexible display film, and automatically move upward according to an instruction of upwardly moving sent by the main body component 10 to drive the attachment head a to move upward. In this way, the piece 4 attached by the attachment head a is peeled off from the flexible display film.

In a specific embodiment, the intelligentized picking sub-system may be any sub-device or sub-system that can automatically control movement according to instructions. For example, the intelligentized picking sub-system is a sub-device that is formed by connecting a servo driver with a picking lever, or is a sub-device that is formed by connecting a control component with a robot, or the like.

In the case where the intelligentized picking sub-system is a sub-device that is formed by connecting a servo driver with a picking lever, the picking lever of the intelligentized picking sub-system is connected with the attachment head by a connection member, and the servo driver drives movement of the picking lever according to a control instruction sent by the main body component 10 and the movement of the picking lever drives the attachment head to move.

In the case where the intelligentized picking sub-system is a sub-device that is formed by connecting a control component with a robot, the robot of the intelligentized picking sub-system is connected with the attachment head by a connection member, the control component drives movement of the robot according to a control instruction sent by the main body component 10 and the movement of the manipulator drives the attachment head to move.

For example, a PI film is taken as an example of the flexible display film, as shown in FIG. 9, the piece-picking component 30 comprises an attachment head a, a connection member b and an intelligentized picking sub-system c. The intelligentized picking sub-system c comprises a control component c1 and a robot c2 connected with each other. The attachment head a and the robot c2 are connected with each other by the connection member b. The attachment head a attaches (i.e., picks) and holds the pieces 4. The control component c1 drives the manipulator c2 to sway when receiving an instruction of swaying sent by the main body component 10 (not show in FIG. 9), so as to drive the attachment head a to sway. Thus, connection between the piece 4 attached by the attachment head a and the PI film is loosened. The control component c1 drives the manipulator c2 to move upward when receiving an instruction of upwardly moving sent by the main body component 10, so as to drive the attachment head a to move upward. In this way, the piece 4 attached by the attachment head a is peeled off from the PI film.

In operation, connection between the piece attached by the attachment head and the flexible display film is first loosened by swaying, and then the attached piece is separated from the flexible display film by upward movement. In this way, a destructive power generated during peeling off the pieces is reduced, and the damage to the flexible display film is reduced.

Therefore, in an embodiment, the piece-picking component 30 comprises an attachment head a configured to pick the pieces to be peeled off, an attachment head driving member (corresponding to the above-mentioned connection member b and robot c2) configured to drive the attachment head to move close to and away from the piece adhered to the wound flexible display film and to be peeled off, and a controller (corresponding to the above-mentioned control component c1) configured to control movement of the attachment head driving member.

In an optional embodiment, the division component 20, in particular along the lengthwise or widthwise direction of the substrate, divides the substrate attached with the flexible display film into N pieces having the same size. The piece at which the IC binding portion lies is the ith piece. N is an integer greater than 1, and i is an integer greater than or equal to 1 and less than or equal to N.

The piece-picking component 30 successively applies peeling operations to the first to i−1th pieces, and does not apply a peeling operation to the ith piece. Then, the piece-picking component 30 successively applies peeling operations to the i+1th to Nth pieces.

In operation, since it is determined that the IC binding portion lies at the ith piece, the piece-picking component 30 can be controlled not to apply the peeling operation to the ith piece.

It should be noted that any methods or means that can control the piece-picking component 30 not to apply the peeling operation to the ith piece are suitable for the present disclosure.

For example, when the piece-picking component 30 is used to peel off the piece that is adhered to the wound flexible display film, the piece-picking component 30 can be controlled not to apply the peeling operation to the ith piece by controlling time intervals between respective piece-peeling operations applied by the piece-picking component 30; or when the piece-picking component 30 is used to successively peel off the pieces along the lengthwise or widthwise direction of the substrate, the piece-picking component 30 can be controlled not to apply the peeling operation to the ith piece by controlling displacement of the piece-picking component 30.

In operation, since the adhesive force at the IC binding portion is much greater than those at other pieces, and thus forcibly peeling off the IC binding portion is likely to damage the IC binding portion and the circuit surrounding it. In an embodiment, the IC binding portion and the circuit surrounding it are protected by retaining the pieces at which the IC binding portion lie. This, to a certain extent, avoids an adverse influence on display performance of the flexible display device and improves a yield of product.

Next, the method of peeling off the pieces according to the present disclosure will be described in details by taking a PI film as an example of the flexible display film. It should be noted that the following embodying method to be described in details is only a preferred embodiment of the present invention.

As shown in FIG. 4, the cutting tool successively cuts the substrate 2 to which the PI film 1 is attached, from the side of the substrate 2 that no PI film 1 is attached and along the lengthwise direction of the substrate 2, into 13 unit blocks having the same size. The IC binding portion 5 lies at the $12^{th}$ unit block. The cutting depth is 0.7 times as deep as the value of thickness of the substrate.

As shown in FIG. 7, with the aid of the film attaching structure, the drum 22 attaches and holds an end of the PI film 1 away from the IC binding portion.

By rolling the drum 22 toward the other end of the PI film 1 (as shown in FIG. 4, the end close to the IC binding portion 5), connection between any two adjacent pieces over which the drum 22 rolls is broken by pressing, so that the substrate is divided into pieces 4. Meanwhile, the PI film 1 is wound up as the drum 22 rolls, so that the PI film 1 previously located below the drum 22 is wound to be above the drum 22, and thus the pieces adhered to the wound PI film 1 is also located above the drum 22.

When the first piece 4 is located above the drum 22, the piece-picking component 30 sticks the first piece 4 located above the drum 22. The first piece 4 is swayed from side to side by an operation of swaying from side to side, such that connection between the first piece 4 and the PI film 1 becomes loose. Then, the first piece 4 is driven by an upward movement to move upwardly, so that the first piece 4 is peeled off from the PI film 1.

Since the divided 13 pieces have the same size, the same piece-peeling time T is set for each piece. In this way, during 11T, the first to 11<sup>th</sup> pieces are successively peeled off. At 12T, the piece-picking component 30 is controlled to stop the peeling operation (that is, the piece-picking component 30 is controlled to stop the peeling operation during the time interval between 11T and 12T. At 13T, the piece-picking component 30 is controlled to peel off the 13<sup>th</sup> piece, as described above.

Figure 10:
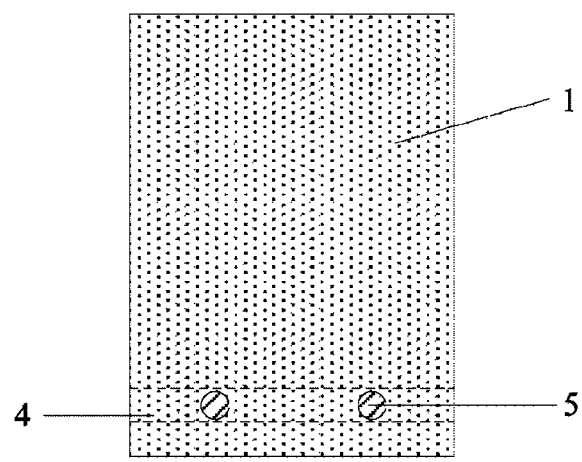
FIG. 10 is a schematic structure view of the PI film that has been peeled off according to an embodiment of the present invention.

As shown in FIG. 10, the piece 4 at which the IC binding portion 5 lies is adhered to the PI film 1, and other pieces adhered to the substrate are peeled off.

It should be noted that the above described embodiments are preferred embodiments of the present invention only and are not intended to limit the present invention. It would be appreciated by those skilled in the art that various changes and substitutions may be made without departing from the principle and spirit of the disclosure. Such changes and substitutions fall within the scope of the disclosure.

What is claimed is:

1. A method of separating a flexible display film from a substrate, comprising the steps of:
    dividing the substrate attached with the flexible display film on a side thereof into a plurality of pieces; and
    separating part or all of the plurality of pieces of the substrate from the flexible display film;
    wherein the flexible display film has an IC binding portion thereon; and
    wherein the step of separating part or all of the plurality of pieces from the flexible display film comprises separating all pieces other than the piece at which the IC binding portion lies from the flexible display film.

2. The method according to claim 1, wherein, the step of separating all pieces other than the piece at which the IC binding portion lies from the flexible display film comprises:
    along a lengthwise or widthwise direction of the substrate, successively dividing the substrate into N pieces having the same size, wherein the piece at which the IC binding portion lies is the ith piece, where N is an integer greater than 1, and i is an integer greater than or equal to 1 and less than or equal to N; and
    where i=1, successively applying peeling operations to the i+1th to N pieces, and not applying the peeling operation to the first piece; where 1<i<N, successively applying peeling operations to the first to i−1th pieces, and not applying the peeling operation to the ith piece, and then successively applying the peeling operations to the i+1th to Nth pieces; and where i=N, successively applying peeling operations to the first to the i−1th pieces, and not applying the peeling operation to the Nth piece.

3. The method according to claim 1, wherein, the step of separating part or all of the plurality of pieces of the substrate from the flexible display film comprises winding the flexible display film.

4. The method according to claim 3, wherein, the step of winding the flexible display film comprises rolling a drum from one end of the flexible display film to the other end of the flexible display film, wherein the drum has a rolling circumferential surface having an attachment function.

5. The method according to claim 4, wherein, the step of separating part or all of the plurality of pieces of the substrate from the flexible display film further comprises picking pieces wound along with the flexible display film by using a piece-picking component, so as to separate the pieces from the flexible display film.

6. The method according to claim 5, wherein, the step of picking the pieces wound along with the flexible display film by using a piece-picking component so as to separate the pieces from the flexible display film comprises using the piece-picking component to attach and hold a piece to be picked, swaying the piece-picking component to loosen connection between the attached piece and the flexible display film, and moving the attached piece away from the flexible display film so as to separate the attached piece from the flexible display film.

7. The method according to claim 1, wherein, the step of dividing the substrate into a plurality of pieces comprises:
    cutting the substrate from another side of the substrate to form a plurality of grooves on the substrate, wherein a depth of the grooves is less than a thickness of the substrate, and the plurality of grooves partition the substrate into the plurality of pieces; and
    applying a pressing force onto one of two adjacent pieces to move the one of the two adjacent pieces with respect to the other of the two adjacent pieces to separate the two adjacent pieces from each other along a corresponding groove.

8. The method according to claim 7, wherein, the step of applying a pressing force onto one of two adjacent pieces to move the one of the two adjacent pieces with respect to the other of the two adjacent pieces comprises rolling a drum from one end of the flexible display film to the other end of the flexible display film to separate the two adjacent pieces from each other along the corresponding groove by using the gravity of the drum and/or pressing force applied on the drum.

9. The method according to claim 8, wherein,
    the drum has a rolling circumferential surface having an attachment function; and
    the step of separating part or all of the plurality of pieces from the flexible display film comprises rolling the drum from the one end of the flexible display film to the other end of the flexible display film so as to wind the flexible display film, and picking pieces wound along with the flexible display film by using a piece-picking component, so as to separate the pieces from the flexible display film.

10. An apparatus for separating a flexible display film from a substrate, the flexible display film having an IC binding portion thereon, the apparatus comprising:
    a division component configured to divide the substrate attached with the flexible display film on a side thereof into a plurality of pieces; and
    a substrate-film separation component configured to separate part or all of the pieces from the flexible display film;
    wherein the substrate-film separation component comprises:
        a drum provided with a film attaching structure, wherein the film attaching structure is configured to attach the flexible display film while the drum rolls over the flexible display film, so as to wind the flexible display film by the drum; and
        a piece-picking component configured to peel off all pieces other than the piece at which the IC binding portion lies from the flexible display film; and
    wherein the film attaching structure comprises a pipeline and at least one air hole passing through a wall of the drum and opening outwards, a vacuum is formed within the pipeline, and the air hole is communicated with the pipeline.

11. The apparatus according to claim 10, wherein, the division component comprises:
    a cutting tool configured to cut the substrate to form a plurality of grooves on the substrate, wherein a depth of the grooves is less than a thickness of the substrate, and the plurality of grooves partition the substrate into the plurality of pieces; and a breaking member configured to apply a pressing force onto one of two adjacent pieces to move the one of the two adjacent pieces with respect to the other of the two adjacent pieces to separate the two adjacent pieces from each other along a corresponding groove.

12. The apparatus according to claim 11, wherein, the breaking member comprises the drum that is adapted to roll on the side of the substrate, and at least the gravity of the drum functions as the pressing force to be exerted on the substrate.

13. The apparatus according to claim 10, wherein, a circumferential surface of the drum is formed by one plane and one curved surface, and the air hole is provided at least in the plane.

14. The apparatus according to claim 10, wherein, the piece-picking component comprises:

an attachment head configured to attach a piece to be peeled off;

an attachment head driving member configured to drive the attachment head to move close to and away from the piece adhered to the wound flexible display film and to be peeled off; and a controller configured to control movement of the attachment head driving member.

15. The apparatus according to claim 14, wherein, based on instructions from the controller, the attachment head driving member is adapted to drive the attachment head attaching the piece to sway, so as to loosen connection between the piece and the flexible display film.

16. The apparatus according to claim 10, wherein, along a lengthwise or widthwise direction of the substrate, a plurality of grooves partition the substrate, to which the flexible display film is attached, into N pieces having the same size, wherein the piece at which the IC binding portion lies is the ith piece, N is an integer greater than 1, and i is an integer greater than or equal to 1 and less than or equal to N.

* * * * *